(No Model.)

J. R. SUTTON.
Cigarette.

No. 235,392. Patented Dec. 14, 1880.

WITNESSES.
Samuel E. Thomas
W. M. Porter

John R. Sutton. INVENTOR.
By W. W. Leggett
ATTORNEY.

UNITED STATES PATENT OFFICE.

JOHN R. SUTTON, OF BROOKLYN, NEW YORK.

CIGARETTE.

SPECIFICATION forming part of Letters Patent No. 235,392, dated December 14, 1880.

Application filed August 18, 1880. (No model.)

*To all whom it may concern:*

Be it known that I, JOHN R. SUTTON, of Brooklyn, county of Kings, and State of New York, have invented a new and useful Improvement in Cigarettes; and I do hereby declare the following to be a full, clear, and exact description of the same, such as will enable others skilled in the art to which it pertains to make and use it, reference being had to the accompanying drawings, which form a part of this specification.

My invention consists in making a cigarette with a glass mouth-piece, the mouth-piece formed with an indentation upon one of its sides, in order that it may be readily held by the teeth and lips, the side opposite the indentation being left in its cylindrical form, in order to strengthen the mouth-piece at this point.

Figure 1:
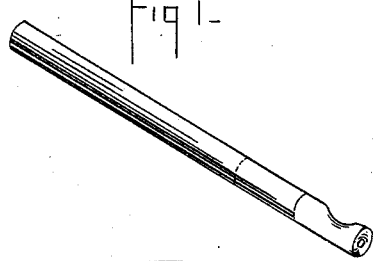
Figure 2:
Figure 3:

In the drawings, Figure 1 is a perspective view of a cigarette with a mouth-piece embodying my invention. Fig. 2 is a longitudinal, and Fig. 3 a cross-sectional, view of the mouth-piece.

Heretofore cigarettes have been made with a mouth-piece of glass permanently attached thereto. The mouth-piece has generally been made of thin glass tubing of the same cylindrical dimensions as the cigarette itself, and has been secured to the cigarette by causing the paper to extend over the end of the glass tube, to which it is pasted. This thin glass tube has then been formed with indentations or concavities upon two opposite sides for the purpose of being readily held between the lips and teeth.
When, however, thin glass is employed for the purpose, and which is most desirable, because of being at once light and cheap, the glass at the point where the indentation is formed upon two edges is rendered very weak, and is liable to be broken. I propose to overcome this difficulty and yet produce an article which can be as readily held by the teeth and lips. I accomplish it as follows: Instead of forming an indentation or concavity upon two opposite sides, I form an indentation on one side only and leave the opposite side in its original cylindrical form.

By thus forming the glass mouth-piece I am enabled to use thin glass tubing, and at the same time the indentation does not materially weaken the tube at the point where it is held between the teeth, for the opposite side of the tube being left in its cylindrical form it renders the tube practically as stiff and strong at this point as at any other part. The outer and inner ends of the tube may or may not be contracted. I generally prefer to fuse and partially contract the outer end in the usual way, but leave the inner end entirely open next to the tobacco.

In the employment of a glass tubular mouth-piece of this character with an indentation upon one side only for the teeth or lips, I do not limit myself to cigarettes alone; but may employ such a mouth-piece in the manufacture of cigars, the rear end extending into the end of the cigar with a sufficient length projecting out from the end of the cigar to constitute the mouth-piece.

What I claim is—

1. A glass mouth-piece for cigars or cigarettes, said mouth-piece consisting of a glass tube having one side indented for the reception of the teeth or lips, the opposite side being left in its tubular form, substantially as described.

2. A cigarette provided with a glass mouth-piece having an indentation upon one side only for the teeth or lips, the opposite side being left in its tubular form, substantially as and for the purposes described.

In testimony whereof I sign this specification in presence of two witnesses.

JOHN R. SUTTON.

Witnesses:
EDWARD MASON,
C. NEWELL DUPREE.